UNITED STATES PATENT OFFICE.

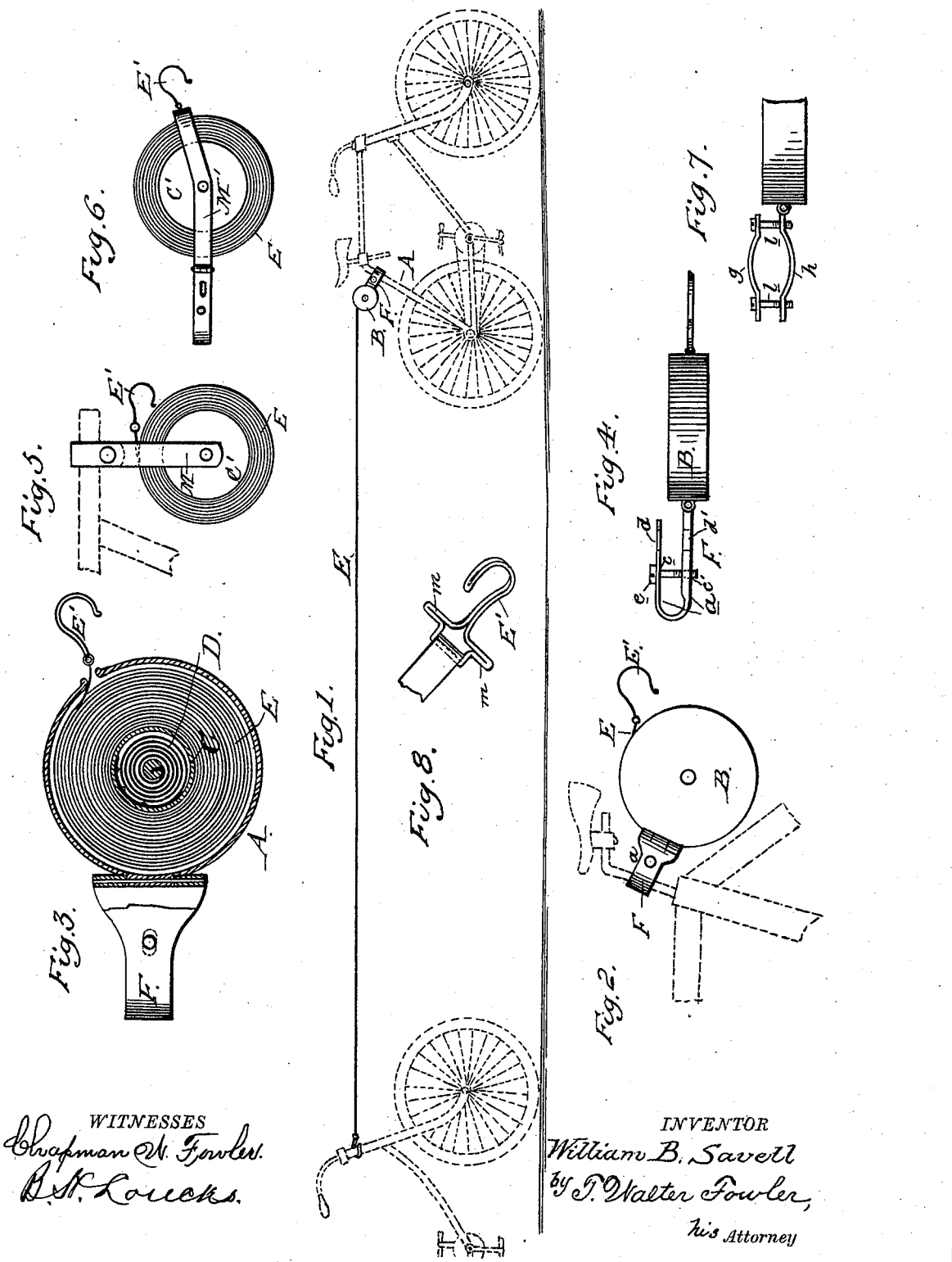

WILLIAM BENJAMIN SAVELL, OF NEWARK, NEW JERSEY, ASSIGNOR OF ONE-HALF TO JOHN D. PIERCE, OF PHILADELPHIA, PENNSYLVANIA.

TOWING APPLIANCE.

SPECIFICATION forming part of Letters Patent No. 581,309, dated April 27, 1897.

Application filed May 2, 1896. Serial No. 590,012. (No model.)

*To all whom it may concern:*

Be it known that I, WILLIAM BENJAMIN SAVELL, a citizen of the United States, residing at Newark, in the county of Essex and State of New Jersey, have invented certain new and useful Improvements in Towing Appliances, of which the following is a specification, reference being had therein to the accompanying drawings.

My invention relates to a means whereby two bicycles, velocipedes, or other wheeled vehicles may be detachably coupled or connected substantially in line, so that one rider is enabled to tow or assist another succeeding him, when desired, the connection between the two vehicles being such that when the tow-line of one is detached from the other it is automatically wound within a containing-case carried on the frame of the vehicle.

The object of my invention is to provide a simple and comparatively inexpensive appliance that is capable of secure attachment to the frame of one vehicle and is provided with a tow-line having means whereby it may be readily attached to the frame of another vehicle, so that when the line is paid out and becomes taut it serves as a connection between the two vehicles and enables the rider of the foremost vehicle to assist the rider of the succeeding vehicle.

My invention consists, primarily, of an appliance to be detachably secured to the frame of a vehicle having an automatically-windable medium or tow-line provided with means for removably attaching its free end to a second vehicle, whereby the two vehicles may be coupled in line and the power of one conveyed through the connection to the other to assist the propulsion of the latter.

My invention also consists of a casing to be detachably secured to the frame of a vehicle and provided with a windable tow-line having a device or means for detachably connecting its free end with a second vehicle, whereby the vehicles are coupled substantially in line, said casing having means for normally winding the tow-line and automatically winding it after it has been unwound and the connection of the second vehicle with the free end of the line is broken, the casing being capable of a lateral swinging movement, whereby it conforms to the variations or movements of the wheels and prevents friction or cutting of the line by the constantly-changing positions of the respective vehicles.

My invention also consists of the parts and the constructions and combinations of parts which I shall hereinafter fully describe and claim.

In the accompanying drawings, forming part of this specification, Figure 1 represents portions of two vehicles with the rear portion of the frame of one coupled or joined to the forward portion of the frame of the other through the medium of a line or connection extending from one to the other. Fig. 2 is an enlarged view of a portion of the frame of a vehicle, showing the casing within which the tow-line or connection is normally wound. Fig. 3 is a sectional view of the casing, showing its spring for automatically winding the distended tow-line when connection between two vehicles is broken. Fig. 4 is a top view of the casing, showing a means for attaching it to the frame of a vehicle. Figs. 5 and 6 are modifications to be hereinafter referred to. Fig. 7 shows a modified form of fastening or clamp. Fig. 8 is a view of the hook E'.

Since the advent into general use, both for business and pleasure, of that class of vehicles known as "bicycles" and "velocipedes," many improvements and attachments have been conceived of and successfully tested that have greatly added to the physical comfort and pleasure of the rider. Great lightness of mechanical parts and easy bearings have materially reduced the power necessary to propel the vehicle. Still the fact remains that many riders, especially females, are greatly fatigued on propelling the vehicle up a hill or along a sandy road, and frequent dismounts are necessary.

The present invention has in view a means whereby a strong and more powerful rider on one vehicle may so connect his machine with a succeeding one that the power of his own machine is utilized to assist the propulsion of the other vehicle and thereby relieve the rider of the second vehicle of unusual strain and fatigue.

Referring now to the drawings for a more complete explanation of my invention, A represents a portion of the frame of a vehicle of the type commonly known as "safety-bicycles." This frame may be of any appropriate style and constitutes a part of any form of bicycle, velocipede, or vehicle. To some portion of this frame—as, for instance, the rear fork or frame-bar of Fig. 1, or the saddle-post of Fig. 2, or to any other suitable part—I attach a casing B, which may be of circular form and is provided with a shaft carrying a revoluble drum C, to which shaft one end of a spring D is connected, the opposite end of the spring being connected with the drum, so that when the drum is turned in one direction the spring is wound, and when the drum is released the spring unwinds and rotates it in a different direction.

Upon the drum C is adapted to be normally wound a tow-line E, of some suitable material, which may be elastic, or partly so, and which has its free end protruding through a slot in the rear or outer side of the casing, and provided with a means, such as a hook or loop—in the present instance I have shown a hook E', as by the use of such a device a connection may be quickly and easily made with the frame of another vehicle—whereby two vehicles may be coupled or connected in line, with one practically towing the other, as shown in Fig. 1.

The forward or inner end of the casing is connected with or carries a clamp F, and by preference I hinge the casing to the clamp in substantially a vertical plane, so that the casing may swing sidewise to enable it to conform to the relative positions of the two connected vehicles and also prevent the line being injured.

Various forms of clamping means may be used to detachably connect the casing with the frame of the vehicle; and two forms of clamps suitable for my purpose are illustrated in Figs. 4 and 7, although I do not limit myself to these forms, as many well-known forms of clamping devices may be used with great success.

The form of clamp shown in Fig. 4 consists of a flat plate $a$, of metal of a compressible or springy nature, connected at one end with the hinge-pin of the casing and having its free end returned upon itself to form a substantially U-shaped portion adapted to embrace one of the frame-bars of the vehicle, as shown in Figs. 1 and 4. In the clamp, holes $c$ $c'$ $d$ $d'$ are made, the holes $c'$ and $d'$ being threaded, for which purpose the main portion of the clamp may be thickened to give it body and stiffness to receive a threaded bolt $e$, whereby the clamp may be made to bind tightly upon the frame, while the pairs of holes provide for adjustment to a larger or smaller part of the frame or to frame-bars of different sizes.

The clamp shown in Fig. 7 consists of two plates or members $g$ $h$, one of which connects with the hinge-pin of the casing. In this instance two bolts $l$ are used, and when the frame-bar is confined between the members $g$ $h$ and the bolts tightened the casing is firmly secured in place and cannot be accidentally dislodged.

From this description it will be apparent that the shell or casing is securely fastened to one vehicle and the normally loose spring in the center will operate to keep the line wound up when not in use and will prevent the line when unwound from sagging or trailing on the ground or under the wheels when the two vehicles approach closely to each other. It will also quickly wind up the line when the latter is released by the rear rider. The line is preferably elastic, so as to avoid sudden jerks of the respective vehicles, which would disturb the equilibrium of the riders and might strain or break some part of the towing device. This elasticity is important, as I have demonstrated by actual experiment. In placing the device in operative position it is not necessary to dismount. The rider on the foremost wheel, or the wheel to which the device is fixedly secured, simply reaches down and takes hold of the free or hook end of the line and then rides close up alongside of the other vehicle and attaches the hook end to some convenient front portion of the other vehicle. He then passes in front of the second vehicle, the line unwinding as he proceeds, until substantially the whole line is paid out. Then the first rider pulls ahead and the power of his machine is transmitted through the tow-line to the succeeding machine to assist the rider thereon propelling said vehicle. By this means a weak rider is assisted by a stronger one in pulling up hill or when greatly fatigued. When reaching the top of the hill or when the rear rider is rested, the first rider slackens his pace and the succeeding one rides up alongside of him and detaches the line from the second vehicle, when the spring in the casing quickly winds up the line without necessitating any dismounting of either rider.

The device is simple, quickly applied, and forms a convenient and effective means whereby one vehicle may be towed by another when desired.

In the modifications shown in Figs. 5 and 6 the exterior surrounding casing of Figs. 1, 2, and 3 is omitted and there is substituted for the same a light open frame of any suitable design, of which the forms shown are appropriate types. These frames M M' straddle the drum C' and receive the ends of the shaft, and the tow-line is wound upon the drum and is guided in any well-known manner in its winding and unwinding. If desired, the hook E' on the end of the tow-line may be formed, substantially as shown in Fig. 6, with laterally-extending arms or extensions $m$, which will be useful in the style of open frames, like those shown in Figs. 5 and 6, to prevent the hook being drawn through the frame. I therefore do not limit myself to the employment of a casing surrounding and inclosing the tow-line, as the latter and its adjuncts are operative as well without as with the closed casing.

Having thus described my invention, what I claim as new, and desire to secure by Letters Patent, is—

1. The article of manufacture consisting of a towing attachment for bicycles and comprising a yielding towing connection and an automatic take-up therefor.

2. In combination for towing bicycles and the like, the cord, line or tension device, a fastener for securing one end thereof to one bicycle or vehicle, means for securing the cord, line or tension device, at the other end to another bicycle or vehicle, and means for automatically taking up the said cord, line, or tension device, thereby preventing slack and permitting the said vehicles to approach without entangling the said cord, line, or tension device, substantially as set forth.

3. A means for connecting vehicles substantially in line whereby the power of one may be transmitted to another, comprising a casing having means for attachment to one vehicle and a spring-actuated tow-line windable within the casing and having means for detachably connecting its free end to a succeeding vehicle.

4. A casing having means whereby it may be secured to the rear portion of a vehicle, a spring-controlled drum within the casing and a line windable upon said drum, having a device at its free end for detachably connecting it with the forward portion of a second vehicle whereby the line elastically connects the two vehicles and serves as a means whereby the power of one vehicle is utilized for towing the second vehicle.

5. The combination, with a bicycle or analogous vehicle, of a support, a clamp secured thereto and adapted to be fixedly secured to the rear portion of the bicycle, a drum within the support having a spring for controlling it, and a tow-line windable upon the drum, having its free end provided with means whereby it may be connected with a succeeding vehicle.

6. A means for connecting vehicles substantially in line comprising a casing to be fixedly secured to the frame of one vehicle, a line windable within the casing and provided, at its free end, with means whereby it may be detachably connected with a succeeding vehicle, and a spring within the casing adapted to be wound as the line is paid out and to automatically wind up the line where the connection with the rear vehicle is broken.

7. A means for connecting vehicles substantially in line, comprising a frame or support to be secured to one vehicle, having a self-winding elastic tow-line, the outer end of which is provided with means for detachably connecting it with a succeeding vehicle, said frame or support being hingedly mounted so that it may conform to the positions of the line and prevent friction and cutting of the line by the changing positions of the respective vehicles.

8. A casing having a revoluble drum within it, a clamp hinged to the casing and adapted to secure the same to a vehicle, a tow-line windable upon the drum and a spring within the drum for normally holding the line wound and automatically winding it when said line is distended and released, and a hook or appliance on the free end of the line adapted to be detachably connected with a second vehicle whereby the power of the foremost vehicle is transmitted through the line to the rear vehicle to assist the movements of the latter.

In testimony whereof I affix my signature in presence of two witnesses.

WILLIAM BENJAMIN SAVELL.

Witnesses:
H. W. CASTE,
H. R. GARIS.